United States Patent [19]

Leiber et al.

[11] Patent Number: 4,785,904

[45] Date of Patent: Nov. 22, 1988

[54] INSTALLATION FOR THE PROPULSION REGULATION IN MOTOR VEHICLES

[75] Inventors: Heinz Leiber, Oberriexingen; Hans Ohnemueller, Reutlingen; Klaus Kastner, Stuttgart, all of Fed. Rep. of Germany

[73] Assignee: Daimler-Benz Aktiengesellschaft, Stuttgart, Fed. Rep. of Germany

[21] Appl. No.: 136,931

[22] Filed: Dec. 23, 1987

[30] Foreign Application Priority Data

Dec. 23, 1986 [DE] Fed. Rep. of Germany ....... 3644136

[51] Int. Cl.$^4$ ............................................. B60K 31/00
[52] U.S. Cl. ..................................................... 180/197
[58] Field of Search ................ 180/197; 123/351, 361; 364/426

[56] References Cited

U.S. PATENT DOCUMENTS 4,712,634  12/1987  Lindemann ..................... 180/197
4,722,411  2/1988  Ohashi et al. ................... 180/197

FOREIGN PATENT DOCUMENTS 3127302  9/1983  Fed. Rep. of Germany.
3603765  8/1986  Fed. Rep. of Germany.

Primary Examiner—John A. Pekar
Attorney, Agent, or Firm—Barnes & Thornburg

[57] ABSTRACT

An installation for the propulsion regulation in motor vehicles acting on the output torque of the driving aggregate for preventing the undesired slippage of the driven vehicle wheels, whereby in case of determining the slippage tendency of a driven wheel, the magnitude determining the output torque is stored and subsequently reduced to its minimum value, is increased after the termination of the acceleration phase of this wheel to a value coordinated to the maximum value of the wheel acceleration which had occurred, is kept constant at this value, and in case of a determination of the ending of the slippage tendency, is increased by a further value coordinated to the maximum value of the wheel deceleration that had occurred whereby the delayed reaction of the drive aggregate is counteracted and a more rapid regulation with slight excess torque and fewer regulating cycles is attained.

10 Claims, 2 Drawing Sheets

INSTALLATION FOR THE PROPULSION REGULATION IN MOTOR VEHICLES

BACKGROUND AND SUMMARY OF THE INVENTION

The present invention relates to propulsion regulation in motor vehicles in the sense of a reduction of the undesired slippage of the driven vehicle wheels, with a regulating circuit responding to the movement condition of at least one driven wheel which, in case of a tendency to slip on the part of this wheel, effects a reduction of the output torque of the drive aggregate.

An installation of this type is known from the DE-PS No. 31 27 302.

In such installations known as drive slippage regulation-DSR-the brakes of one or both driven wheels are actuated upon a determination of a slippage tendency (when a regulating magnitude exceeds a threshold value) of at least one driven wheel, or a magnitude determining the output torque of the driving aggregate (fuel injection quantity or throttle valve opening angle) is reduced with a predetermined adjusting velocity until the monitored regulating magnitude again drops below the threshold value whereupon the brakes are released and, for example, the throttle valve angle is again increased with predetermined adjusting velocity.

The time delay between the adjustment of the throttle valve and the reaction of the engine which amounts approximately to 200 ms, causes undesirable regulation action on the driving torque. This time delay becomes particularly disadvantageous with a drive slippage regulation that regulates exclusively the driving torque and does not dispose of a "fast regulating circuit" acting on the wheel brakes. In this case there is no assurance that the engine torque can be matched optimally and sufficiently quickly to the requirements by adjustment of the throttle valve such, in order to avoid an excessively large regulating deviation.

It is the object of the present invention to improve the regulation of the magnitude determining the output torque of the drive aggregate that during the regulation of a driven wheel as small as possible an excess torque both in the positive as also in the negative terminal phase of the regulating cycle occurs at this wheel.

The underlying problems are solved according to the present invention in that the regulating circuit is so constructed hat the instantaneous value of the magnitude determining the output torque is stored and the magnitude itself is reduced to its minimum value if a value coordinated to the velocity of a driven wheel exceeds the threshold value coordinated to the vehicle velocity thus the magnitude is brought to a value which is smaller than the instantaneous value stored in the respective regulating cycle by a value dependent on the stored instantaneous value, on the engine rotational speed, on the ratio of the engine rotational speed to the rotational speed of the driven wheel and on the maximum value of the wheel acceleration that has occurred since exceeding the threshold value coordinated to the vehicle velocity, if the acceleration of the driven wheel passes over into a deceleration, and in that the magnitude is increased to a value which is greater than the value previously kept constant by an amount dependent on the stored instantaneous value, on the engine rotational speed, on the ratio of the engine rotational speed to the rotational speed of the driven wheel and on the maximum value of the wheel deceleration that has occurred since the beginning of the wheel deceleration, if the value coordinated to the velocity of the driven wheel drops below the threshold value coordinated to the vehicle velocity.

The advantage of this method according to the present invention resides in the regulation of the excess driving torque which is proportional to the acceleration of the wheel under consideration.

After a complete regulation of the engine torque to the idling limit (idling rotational speed) of the engine during the beginning of regulation, i.e., when the driven wheel exceeds, for example, a slippage threshold, the engine torque is increased to a value coordinated to the measured maximum wheel acceleration when the wheel acceleration disappears as a result of the regulation, i.e., passes over into a deceleration. In this manner, the driving torque can be corrected more rapidly and more exactly during the acceleration phase. The excess engine driving torque is reduced corresponding to the measured maximum acceleration during the first phase of the regulating cycle which is characterized by a slippage increase, by way of the engine performance graph (set of characteristic curves) and in the second phase of the regulating cycle (slippage decrease) a slight excess in friction torque transmitted from the tire is effective. The following movement equation of the wheel is valid as calculation basis:

$$\dot{\omega} = \frac{M_M - M_R}{\Theta}$$

wherein $\dot{\omega}$ is the circumferential acceleration of the wheel,
$M_M$ is the engine torque,
$M_R$ is the friction torque, and
$\Theta$ is the inertia moment.

The further regulation in the deceleration phase of the wheel takes place in a similar manner so that altogether a small regulating deviation occurs in the following regulating cycle. Also in this case, the maximum value of the negative acceleration is evaluated for the increase of the driving torque as soon as the first regulating cycle is terminated.

The regulation can be optimized by taking into consideration longitudinal and cross acceleration signals(-steering angle signals) depending on requirements as regards more traction or stability.

More stability is attainable if the engine torque is reduced more strongly on the basis of the measured acceleration values and subsequently, after the regulating magnitude has fallen below the threshold value, is increased, not immediately but with time delay. As a result thereof, the vehicle is able to stabilize which is of advantage in particular in a curve after a sudden depression of the gas pedal, (kick-down).

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

An illustration of a corresponding installation which essentially consists of sensors for the required input magnitudes, of a process computer and of a so-called electronic gas pedal, in a manner similar to that disclosed in the DE-PS No. 31 27 302 is not believed necessary, as such, since such schematic illustrations are known. However, for the sake of convenience, a typical installation will be briefly described by reference to FIG. 2.

Figure 1:
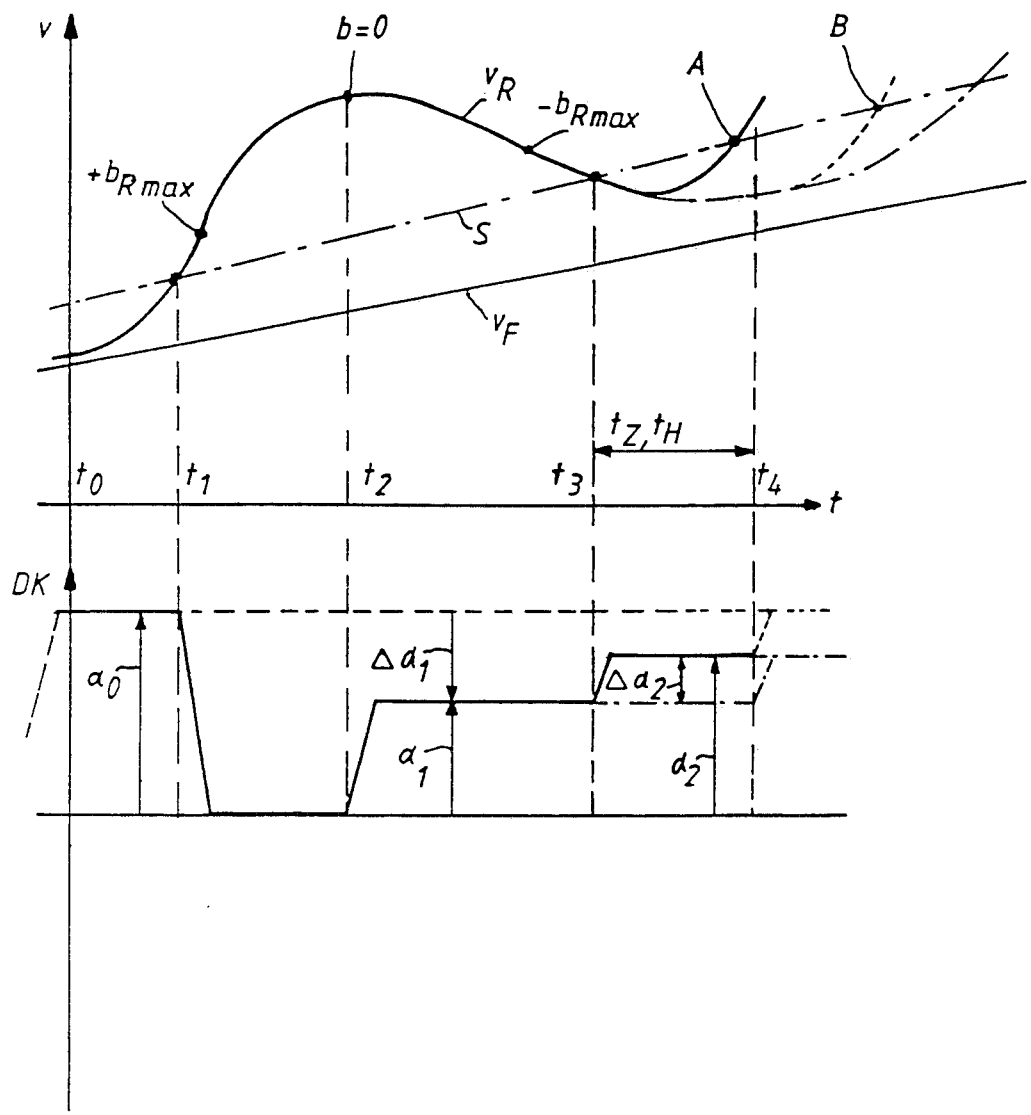
FIG. 1 is a diagram of a single regulating cycle of the propulsion regulation in accordance with the present invention which acts on the throttle valve of the carburetor of a motor vehicle internal combustion engine whereby the velocity of a driven wheel and of the vehicle is illustrated in the upper part of the diagram and the opening angle of the throttle valve, plotted against time, is illustrated in the lower part.

For the sake of simplicity, the vehicle velocity $v_F$, for example, corresponding to the average wheel circumferential velocity of the non-driven wheels, is illustrated in FIG. 1 as straight line whose slope is proportional to the vehicle acceleration. A further straight line S illustrated in dash-and-dotted lines and having a slightly greater slope, represents a predetermined threshold value, for example, a predetermined slippage, in relation to the vehicle velocity $v_F$. The full line curve is an assumed curve of the wheel circumferential velocity $v_R$ of a driven wheel of the motor vehicle under consideration which will be described in detail hereinafter.

It is assumed initially that the driver of the continuously accelerating vehicle has increased the throttle valve angle to a value $\alpha_0$ prior to the instant of time $t_0$ by a sudden depression of the gas pedal. For that reason, the driven wheels receive a greater driving torque than they can transmit to the road surface: they begin to slip. This becomes noticeable by an increasing wheel circumferential velocity $v_R$ with corresponding acceleration.

At the instant of time $t_1$, a driven wheel which will be considered more fully hereinafter, exceeds the predetermined threshold value S coordinated to the respective vehicle velocity, for example, a predetermined slippage value.

This is the beginning of a regulating cycle of the regulating installation according to the present invention. The value $\alpha_0$ of the throttle valve angle which is measured at this instant is stored. Subsequent thereto, the throttle valve is closed nearly to the idling limit. As a result of the torque excess, the driven wheel continues to accelerate to reach at the turning point of the curve $v_R$, the value of the maximum acceleration $+b_{Rmax}$, which is reduced in the further course as a result of the missing engine torque and reaches the value at the point $t_2$. The wheel acceleration is continuously determined, and the measured maximum value is stored.

As the excess driving torque which is to be regulated is proportional to the wheel acceleration, the driving torque can be calculated from the throttle valve position, engine rotational speed, ratio of engine rotational speed to wheel rotational speed and wheel acceleration and can be corrected.

A value $\Delta\alpha_1$ is therefore determined (calculated or taken from a performance graph) from the stored value $\alpha_0$ of the throttle valve position, the engine rotational speed, the ratio of the engine rotational speed to the wheel rotational speed and the maximum value $+b_{Rmax}$ of the wheel acceleration determined during the regulating operation, by which value the stored value $\alpha_0$ is reduced. At the instant of time $t_2$ the throttle valve is therefore opened to a value $\alpha_0 1 = \alpha_0 - \Delta\alpha_1$ and is kept kept constant at this value.

At the instant of time $t_2$, the wheel acceleration passes over into a wheel deceleration, i.e., the wheel circumferential velocity $v_R$ again approaches the vehicle velocity $v_F$ until at the instant of time $t_3$ the circumferential wheel velocity $v_R$ again drops below the threshold value S. At this instant, the throttle valve angle $\alpha_1$ is increased by a valve $\Delta\alpha_2$ to a value $\alpha_2 = \alpha_1 + \Delta\alpha_2$, except for predetermined situations to be described more fully hereinafter. In this case $\alpha_2$ is the new stored starting value.

The value $\Delta\alpha_2$ is thereby determined in a manner similar to the value $\Delta\alpha_1$ with the exception that in lieu of $\alpha_0$ the value $\alpha_1$ and in lieu of the maximum value $+b_{Rmax}$ of the acceleration, the maximum value $-b_{Rmax}$ of the wheel deceleration which is measured between the instants of time $t_2$ and $t_3$, is now utilized for the determination of the value $\Delta\alpha_2$. The remaining magnitudes remain the same.

Owing to this reduction of the engine torque dependent on the maximum wheel acceleration and the subsequent increase, dependent on the maximum wheel deceleration, a "lead regulation", so to speak of, is realized which takes into consideration the dead times of the regulation and the reaction time of the engine. The maximum regulation deviation as well as the duration and number of the regulation cycles can be decreased therewith which occur as a consequence of a sudden depressing of the gas pedal.

The last-described increase of the engine torque owing to an increase of the throttle valve angle by $\Delta\alpha_2$ is normally so selected that it suffices to subsequently guide the wheel with slight excess torque again into the unstable range whereupon a new regulating cycle commences as described.

According to a further feature of the present invention, provision is made to utilize also the vehicle longitudinal acceleration $b_x$ for the determination of $\alpha_1$, respectively, $\alpha_2$. More specifically, if also a higher vehicle longitudinal acceleration follows a corresponding throttle valve position, then one can conclude therefrom the presence of a dry gripping road surface, onto which higher driving torques can be transmitted.

Additionally, provision is made according to the present invention to utilize the vehicle cross acceleration (or the steering angle) for the determination of $\Delta\alpha_1$, respectively, $\Delta\alpha_2$ in that during vehicle cross acceleration, smaller values are outputted for $\Delta\alpha_1$, respectively, $\Delta\alpha_2$ and additionally a holding period $t_H$ beginning at the instant of time $t_3$ can be provided by which the throttle valve angle increase $\Delta\alpha_2$ is delayed, as a result of which the vehicle can again stabilize itself. This is indicated in the drawing by dash-and-dotted lines and by the indication of the holding period which begins at the instant $t_3$ and ends at the instant $t_4$. The duration of this holding period may be variable dependent on the measured maximum value $-b_{Rmax}$ of the wheel deceleration for purposes of optimal stabilization duration.

Furthermore, a time window $t_Z$ may be provided which is activated when no cross acceleration is measured and therefore no delay of the throttle valve angle increase becomes effective, in order to examine after dropping below the threshold value S at the instant of time $t_3$ whether the threshold value is again exceeded by the regulating magnitude within a predetermined time period. For the sake of simplicity, the duration $t_Z$ of the time window is illustrated to be of equal length as the holding period $t_H$.

In the normal case (full line curve), the threshold value is exceeded prior to the end of this time window at the point A, whereupon a new regulating cycle commences as already explained. If, however, the engine torque increase by $\Delta\alpha_2$ does not suffice to accelerate the wheel in such a manner that it exceeds the threshold value S within the time window $t_Z$, then a further stepwise increase of the throttle valve angle takes place after termination of the time window, possibly up to the magnitude of the desired value specified by the driver. Thereupon, the threshold value is exceeded in the point B if sufficient driving torque is present. This case is indicated in the drawing by dash lines.

The foregoing consideration is limited to one driven wheel. An identical regulating installation is present for the second driven wheel of the same axle and provides, similar, but as a rule with deviating curves adjusting magnitudes corresponding to the magnitudes measured for this second wheel. Of the two adjusting magnitudes, the smaller one is permitted to pass through to the position transmitter of the "electronic gas pedal" and the throttle valve angle is regulated thereafter.

In order to attain a still more rapid regulation of the excess torque, a further magnitude influencing the engine torque, for example, the ignition, can be interrupted (or adjusted to retarded ignition), for example, between the instants of time $t_1$ and $t_2$.

Figure 2:
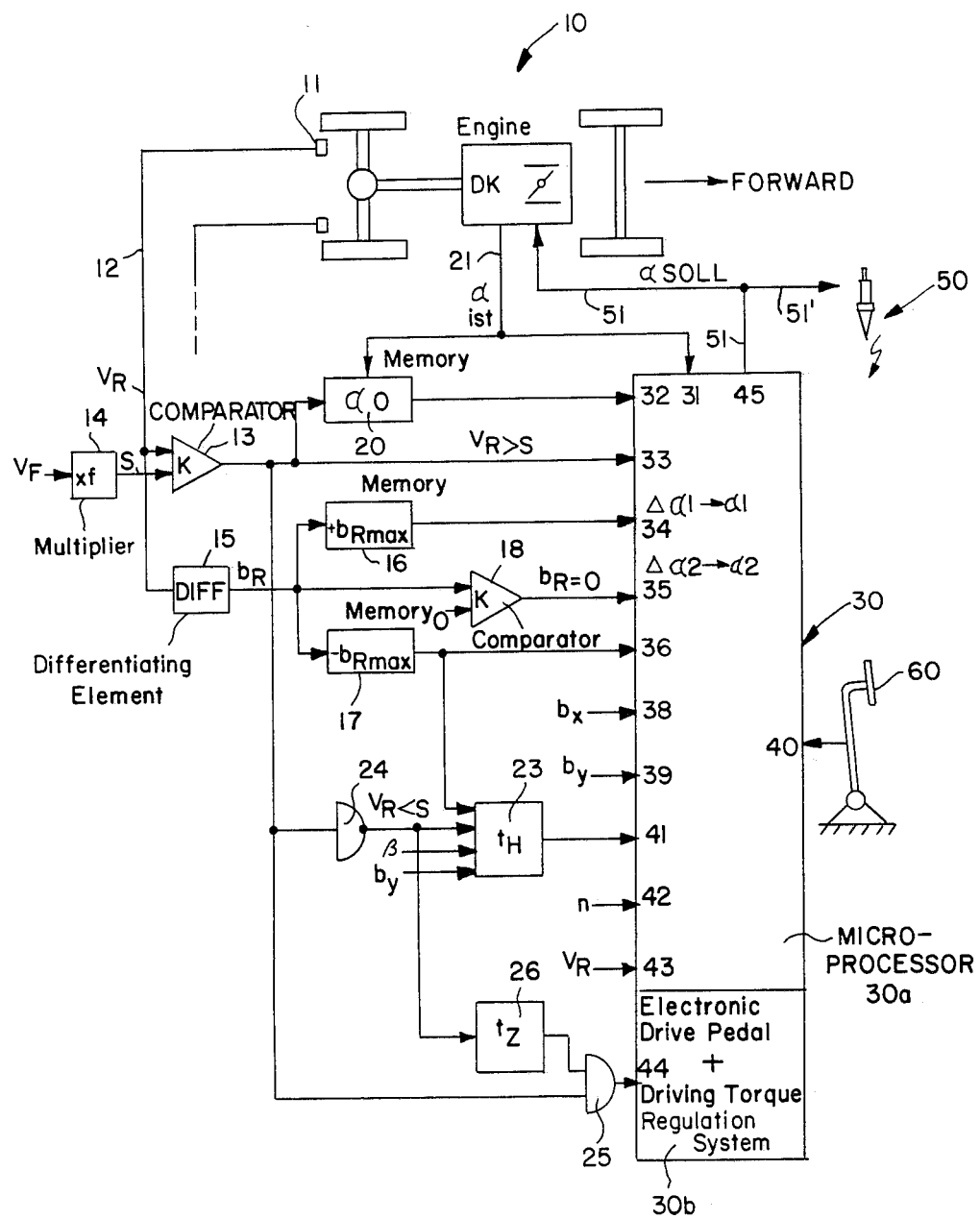
FIG. 2 is a schematic block diagram of a regulation system according to the invention which is suitable to carry out the functions explained by reference to the diagram of FIG. 1.

FIG. 2 illustrates in block diagram a regulating installation in accordance with the present invention in which an engine generally designated by reference numeral 10 drives a motor vehicle whose forward driving direction is indicated by the arrow "forward". The engine includes a schematically indicated throttle valve, whose opening angle is regulated to thereby control the driving torque of the engine. In the block diagram of FIG. 2, the regulating system of only the left rear wheel is shown, it being understood that a similar system is provided for the right rear wheel with the two systems cooperating in the manner discussed hereinabove.

The circumferential velocity of the left rear wheel $v_R$ is determined by a pick-up or transmitter 11 whose output is connected by way of a line 12 with one input of comparator 13. The vehicle velocity $v_F$, determined in any conventional manner is applied to the multiplier 14 in which this vehicle velocity is multiplied by a predetermined factor associated with the given velocity to produce a threshold value S applied to the other input of the comparator 13 (see also FIG. 1). The circumferential velocity $v_R$ of the left rear wheel is also applied to the input of a differentiating element 15 which, in its output produces a value representing positive or negative acceleration (deceleration) of the circumferential velocity of the left rear wheel. The maximum acceleration value $+b_{Rmax}$ in a given cycle is stored in memory 16 while the minimum deceleration value $-b_{Rmax}$ is stored in the memory 17. The output of the differentiating element 15 is additionally applied to one input of comparator 18, to the other input of which is applied zero acceleration so that the output of comparator 18 provides an indication when $b_R=0$, which is applied to input terminal 35 of th microprocessor 30a.

The actual position of the throttle valve $\alpha_{ist}$, as determined by a conventional position transmitter, is fed by way of line 21 to another input of memory 20 and is also applied to input 31 of the microprocessor 30a forming part of the electronic control unit generally designated by reference numeral 30 which also includes the electronic drive pedal and driving torque regulation system 30b. The position of the drive pedal 60, as determined by a position transmitter (not shown) is applied to input 40 of the microprocessor 30a.

The output of comparator 13, indicating that the circumferential velocity $v_R$ is greater than the threshold value S is applied directly to input 33 of the microprocessor 30a. The output of memory 16 is applied directly to input 34 of the microprocessor 30a for use in determining the values $\Delta\alpha_1$ and $\alpha_1$. Similarly, the output of comparator 18 is fed to input 35 of the microprocessor 30a for use in determining $\Delta\alpha_2$ and $\alpha_2$ as explained above. Additionally applied to the microprocessor 30a at its inputs 38 and 39 are the vehicle longitudinal acceleration $b_X$ and the vehicle cross-acceleration $b_y$. The output of comparator 13 is further applied to one input of delay element 23 by way of inverting element 24 which produces an output when $v_R$ is smaller than the threshold value S. The duration of the holding period of time $t_H$ produced by the delay element 23, whose output is connected to input terminal 41 of the microprocessor 30a, can be varied in a conventional manner by the value $-b_{Rmax}$ from memory 17. The increase by the value $\Delta\alpha_2$ is then delayed by a predeterminable holding period $t_H$ when the circumferential velocity of the left rear wheel drops below the threshold value and when an output signal $\beta$ is present from a steering angle transmitter (not shown) or an output signal $b_y$ is present from a cross-acceleration transmitter (not shown).

As pointed out above, a further increase in the throttle valve opening is undertaken when the circumferential velocity $v_R$ of the left rear wheel does not exceed the threshold value S within a predeterminable time window $t_Z$. This is achieved by applying the output of the comparator 13 to one input of an AND-element 25 and by applying the output of inverting element 24, indicating $v_R<S$, to the delay element 26 which then produces the time window $t_Z$ applied to the other input of AND-element 25.

In operation, the instantaneous value $\alpha_0$ determining the engine output torque is stored in memory 20; the throttle valve opening angle $\alpha$ is reduced to its minimum value when the value coordinated to the velocity $v_R$ of the left driven wheel exceeds the threshold value S coordinated to the vehicle velocity $v_F$ which initiates a regulating cycle. The throttle valve opening angle is then decreased to a value $\alpha_1$ which is smaller than the instantaneous value $\alpha_0$ stored during the respective regulating cycle by a value $\Delta\alpha_1$, dependent on the stored instantaneous value $\alpha_0$, applied to input 32, on the engine rotational speed n applied to input 42, on the ratio of the engine rotational speed to the rotational speed of the driven wheel as determined in the microprocessor and on the maximum value $+b_{Rmax}$ of the wheel acceleration which has occurred since the threshold value S coordinated to the vehicle velocity has been exceeded, as applied to input 34 of the microprocessor 30. The throttle valve opening angle is then again increased by a value $\Delta\alpha_2$ which is greater than the value $\alpha_1$ previously kept constant by a value $\Delta\alpha_2$ which is dependent on the stored instantaneous value $\alpha_1$, now stored in memory 20, on the engine rotational speed as applied to input 42 of the microprocessor 30a, on the ratio of the engine rotational speed to the rotational speed of the driven wheel as determined in the microprocessor 30a and on the minimum value $-b_{Rmax}$ of the wheel deceleration which has occurred since the beginning of the wheel deceleration. The microprocessor 30a also takes into consideration the values of the vehicle longitudinal and/or cross acceleration $b_X$ and $b_Y$, applied to inputs 38 and 39 of the microprocessor 30a, in its determination of the values $\Delta\alpha_1$ $\Delta\alpha_2$, etc. as explained above. The increase by the value $\Delta\alpha_2$ can be delayed by the delay element 23 by a period of time dependent on $-b_{Rmax}$ after the value coordinated to the circumferential velocity $v_R$ of the driven wheel has fallen below the threshold value S and an output signal is present either from the steering angle transmitter ($\beta$) or the cross acceleration transmitter ($b_y$).

As explained above, a further stepwise increase of the value $\alpha$ is undertaken in the driving torque regulation system 30b when the wheel circumferential velocity $v_R$ does not exceed the threshold value S within a predeterminable time period $t_z$ after the value $v_R$ has dropped below this threshold value. This is achieved by the use of the delay element 26 in combination with the AND-element 25 whose output is applied to input terminal 44 of the electronic control unit 30b.

The output of the microprocessor 30a from terminal 45 which contains the $\alpha_{Soll}$ value is not only applied to the throttle valve of the engine 10 but may also be applied to a further element, such as the ignition system 50 schematically indicated in FIG. 2 by way of line 51 to further influence the magnitude determining the output torque.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An installation for the propulsion regulation in motor vehicles in the sense of a prevention of the undesired slippage of driven vehicle wheels, comprising regulating circuit means responding to the movement condition of at least one driven wheel which is operable to effect a reduction of the output torque of a driving aggregate in case of a slippage tendency, measuring means detecting the vehicle velocity and the wheel circumferential velocities of the driven wheels and producing output signals, and comparing means responding at least to one threshold value coordinated to the vehicle velocity, said regulating means including means for storing the instantaneous value of a magnitude determining the output torque, means for reducing the magnitude substantially to its minimum value when a value coordinated to the velocity of a driven wheel exceeds the threshold value coordinated to the vehicle velocity, and further means for changing said magnitude to a value which is smaller than that of the instantaneous value stored in a respective regulating cycle by a value dependent on the stored instantaneous value, on the engine rotational speed, on the ratio of the engine rotational speed to the rotational speed of the driven wheel and on the maximum value of the wheel acceleration which has occurred since exceeding the threshold value coordinated to the vehicle velocity, when the acceleration of the driven wheel passes over into a deceleration, and for changing said magnitude to another value which is larger than the value previously kept constant by a value dependent on the stored instantaneous value, on the engine rotational speed, on the ratio of the engine rotational speed to the rotational speed of the driven wheel and on the maximum value of the wheel deceleration that has occurred since the beginning of the wheel deceleration, when the value coordinated to the velocity of the driven wheel has dropped below the threshold value coordinated to the vehicle velocity.

2. An installation according to claim 1, wherein the values by which said magnitude is reduced or increased, are variable in dependence on the vehicle longitudinal and/or cross acceleraton.

3. An installation according to claim 1, further comprising delay means for delaying the increase of said magnitude by said value when dropping below said threshold value, by a predeterminable holding period if an output signal of a steering angle or cross acceleration transmitter is present.

4. An installation according to claim 3, further comprising means for changing the duration of the holding period as a function of maximum value of the wheel deceleration.

5. An installation according to claim 3, further comprising means for undertaking a further increase of said magnitude if a renewed exceeding of the threshold value does not take place within a predeterminable time window after dropping below said threshold value.

6. An installation according to claim 5, wherein a further magnitude also influencing the output torque is controlled by means of the magnitude determining the output torque.

7. An installation according to claim 6, further comprising means for changing the duration of the holding period as a function of maximum value of the wheel deceleration.

8. An installation according to claim 7, wherein a further magnitude also influencing the output torque is controlled by means of the magnitude determining the output torque.

9. An installation according to claim 1, further comprising means for undertaking a further increase of said magnitude if a renewed exceeding of the threshold value does not take place within a predeterminable time window after dropping below said threshold value.

10. An installation according to claim 1, wherein a further magnitude also influencing the output torque is controlled by means of the magnitude determining the output torque.

* * * * *